(12) United States Patent
Maltman et al.

(10) Patent No.: US 11,383,153 B2
(45) Date of Patent: Jul. 12, 2022

(54) LOTTERY TICKET PACKS WITH IDENTIFICATION AND SECURITY IMAGE AND ASSOCIATED METHOD FOR MAKING

(71) Applicant: Scientific Games International, Inc., Newark, DE (US)

(72) Inventors: Paula Kelly Maltman, Cumming, GA (US); Christopher Garnet Akins, Flowery Branch, GA (US); Scott B. Garrison, Duluth, GA (US); Ashley Ivery Gantt, Woodstock, GA (US)

(73) Assignee: Scientific Games, LLC, Alpharetta, GA (US)

( * ) Notice: Subject to any disclaimer, the term of this patent is extended or adjusted under 35 U.S.C. 154(b) by 0 days.

(21) Appl. No.: 16/436,477

(22) Filed: Jun. 10, 2019

(65) Prior Publication Data

US 2020/0384347 A1    Dec. 10, 2020

(51) Int. Cl.
*A63F 3/06* (2006.01)
*G06K 19/06* (2006.01)
*G07F 17/32* (2006.01)

(52) U.S. Cl.
CPC .......... *A63F 3/0655* (2013.01); *A63F 3/0665* (2013.01); *G06K 19/06018* (2013.01); *G07F 17/329* (2013.01)

(58) Field of Classification Search
CPC . G06K 19/06018; A63F 3/0655; A63F 3/066; A63F 3/0665; G07F 17/329
USPC ........................................................ 273/139
See application file for complete search history.

(56) References Cited

U.S. PATENT DOCUMENTS

| 1,459,343 | A | * | 6/1923 | Porter | G04B 33/14 |
| | | | | | 368/88 |
| 3,512,780 | A | * | 5/1970 | Allison | A63F 3/069 |
| | | | | | 273/139 |
| 4,004,813 | A | * | 1/1977 | Sanden | A63F 3/08 |
| | | | | | 273/139 |
| 4,099,721 | A | * | 7/1978 | Logander | A63F 3/069 |
| | | | | | 273/139 |
| 4,191,376 | A | * | 3/1980 | Goldman | A63F 3/0645 |
| | | | | | 235/385 |

(Continued)

FOREIGN PATENT DOCUMENTS

WO    WO 2011/124952    10/2011

*Primary Examiner* — Michael D Dennis
(74) *Attorney, Agent, or Firm* — Dority & Manning, P.A.

(57) ABSTRACT

A pack of lottery tickets includes a plurality of interconnected lottery tickets fan-folded into a stack, wherein each lottery ticket comprises a first side edge. A code on each lottery ticket identifies the pack and an order or position of the lottery ticket in the pack. A marking pattern is printed along the first side edge of each of the lottery tickets and includes at least one mark. The pack has a side face defined by the stacked first side edges of the tickets in the stack, wherein the marking pattern on the lottery ticket side edges align so as to form a unique identification image on the side face of the pack. The marking pattern on each lottery ticket is unique to the respective ticket such that each lottery ticket in the pack can be separately authenticated at a later time by comparing its marking pattern to a retrieved or replicated image of the marking pattern based on the pack identification and order of the lottery ticket in the pack provided by the ticket code.

18 Claims, 3 Drawing Sheets

(56) References Cited

U.S. PATENT DOCUMENTS

| | | | | |
|---|---|---|---|---|
| 4,299,637 | A * | 11/1981 | Oberdeck | A63F 3/065 101/483 |
| 4,788,153 | A * | 11/1988 | Detwiler | G01N 33/526 422/423 |
| 5,085,417 | A * | 2/1992 | Copham | B41F 13/54 270/1.02 |
| 5,125,689 | A * | 6/1992 | Heninger | A63F 3/069 273/139 |
| 6,000,725 | A * | 12/1999 | Nicolosi | A63F 3/065 235/487 |
| 6,048,114 | A | 4/2000 | de Troz | |
| 6,347,794 | B2 * | 2/2002 | Scrymgeour | A63F 3/0665 273/138.1 |
| 6,585,163 | B1 * | 7/2003 | Meunier | G06K 19/06028 235/385 |
| 6,599,187 | B2 * | 7/2003 | Gerow | A63F 3/069 273/138.1 |
| 6,948,742 | B2 * | 9/2005 | Buck | B42D 15/025 229/300 |
| 7,016,861 | B2 * | 3/2006 | Mothwurf | G06Q 30/0212 221/255 |
| 7,472,926 | B2 * | 1/2009 | Friesen | A63F 3/065 283/100 |
| 7,789,310 | B2 * | 9/2010 | Butikofer | G03G 15/6511 235/487 |
| 7,900,845 | B2 * | 3/2011 | Stagg | B42D 15/045 235/493 |
| 8,043,154 | B2 * | 10/2011 | Bennett, III | G07C 15/00 463/17 |
| 9,718,577 | B2 * | 8/2017 | Martineck, Sr. | B65D 83/12 |
| 10,183,213 | B2 * | 1/2019 | Irwin, Jr | A63F 3/0655 |
| 10,289,874 | B2 * | 5/2019 | Smith | G06K 1/121 |
| 10,424,167 | B2 * | 9/2019 | Garrison | G07F 17/329 |
| 10,596,830 | B1 * | 3/2020 | Veres | B41J 3/4073 |
| 2001/0002079 | A1 * | 5/2001 | Scrymgeour | A63F 3/0665 273/138.1 |
| 2003/0045340 | A1 * | 3/2003 | Roberts | A63F 3/0615 463/17 |
| 2005/0127602 | A1 * | 6/2005 | Scrymgeour | B65D 77/003 273/139 |
| 2005/0248808 | A1 * | 11/2005 | Ma | H04N 1/38 358/1.15 |
| 2006/0055108 | A1 * | 3/2006 | Lambert | A63F 3/0665 273/139 |
| 2006/0261546 | A1 * | 11/2006 | Payne | A63F 3/0605 273/139 |
| 2007/0154250 | A1 | 7/2007 | Cahill et al. | |
| 2007/0210514 | A1 * | 9/2007 | Ellis | A63F 3/0655 273/139 |
| 2009/0283971 | A1 * | 11/2009 | Martineck, Sr. | A63F 3/0665 273/293 |
| 2012/0161394 | A1 * | 6/2012 | Weinreich | A63F 9/12 273/153 R |
| 2013/0200606 | A1 * | 8/2013 | Omar | B41M 3/14 283/74 |
| 2015/0042041 | A1 * | 2/2015 | Bedford | A63F 3/065 273/139 |
| 2017/0015489 | A1 * | 1/2017 | Martineck, Sr. | B65D 83/12 |
| 2017/0345252 | A1 * | 11/2017 | Martineck, Sr. | G07F 17/329 |
| 2019/0151749 | A1 * | 5/2019 | Irwin, Jr. | B42D 25/285 |

* cited by examiner

LOTTERY TICKET PACKS WITH IDENTIFICATION AND SECURITY IMAGE AND ASSOCIATED METHOD FOR MAKING

FIELD OF THE INVENTION

The present invention relates generally to the field of game tickets, such as lottery game tickets, and more particularly to a means to provide a unique identification image on a side face of a stack of the tickets, wherein the identification image also functions as a security feature for individual tickets.

BACKGROUND

A common type of lottery game ticket is known as a "scratch-off" ticket wherein one or more game plays are printed onto a front surface of a card stock. The player scratches off an opaque layer in a game play area of the ticket to reveal underlying indicia that dictates whether or not the ticket is a winner. Such game tickets are also referred to as "scratch-off" tickets. These tickets are typically provided to vendors in packs of fan-folded, interconnected tickets. For example, each pack may contain 150 fan-folded tickets.

Lottery ticket vendors must have the ability to identify each individual ticket pack for accountability and security reasons. Generally, the retail vendors need to have this ability when viewing the ticket packs from a side view of each pack, particularly when the packs are stacked and stored in a secure location, such as a safe. For this purpose, a conventional practice of the ticket manufacturer is to place (e.g., adhere) a label or card either inside of the pack wrapping or directly to the wrapping, wherein the label or card is at the side face of the ticket pack and contains a barcode or alpha-numeric image identification mark. A problem with this practice, however, is that the labels/cards tend to misalign or skew within the wrapping, which makes them very difficult to read, or fall off of the outside of the wrapping and are essentially useless. Another practice is to place an identification card or label at the top surface of the stack. However, this requires the vendor to remove the packs from the safe in order to see the top surface of the pack.

Various suggestions have been proposed in the art to print unique identification images or marks directly onto the side face of a ticket pack. For example, WO 2011/124952 discusses the integrity of packs of instant lottery tickets from manufacturing through transit and sale at a retail location, as well as various security procedures developed to protect the integrity of instant ticket packs from manufacturing, through distribution, to the retail location. The packs are typically tagged with unique serial number barcodes, sealed in shrink-wrap, and logged on a central site server when received at the retail location. The publication explains that, for logistical reasons, these security procedures are designed to track the pack as a whole and not the individual tickets that comprise the pack. Additionally, once the packs are placed on sale at a retail location, the integrity of the pack is broken as tickets are typically sold individually to the public.

The WO 2011/124952 publication suggests that by imaging designs on the sides of instant ticket packs, a visual indication that the complete stack of tickets is intact becomes obvious by casual inspection. Any tickets removed or replaced with altered tickets are quickly noticed as they fail to conform to the imaging associated with the pack of tickets. Thus, it is suggested that the overall image printed on the side of the pack of tickets can uniquely identify the pack and also act as a security measure with respect to counterfeit tickets being inserted into the pack. An obvious visual alteration to the overall image on the ticket pack indicates that one or more counterfeit tickets have been inserted into the pack. This system/method, however, does not provide a means for identifying counterfeit tickets at a later time, for example when such counterfeit tickets are presented for redemption.

Accordingly, it is desirable to provide a permanent, unique identification image on the side face of the ticket pack that can also function to identify counterfeit tickets even when such tickets are removed from the pack.

SUMMARY OF THE INVENTION

Objects and advantages of the invention will be set forth in part in the following description, or may be obvious from the description, or may be learned through practice of the invention.

In accordance with aspects of the invention, individual packs of lottery tickets, such as scratch-off lottery tickets, are provided wherein each pack includes a plurality of interconnected (end-to-end) lottery tickets fan-folded into a stack. Each lottery ticket includes a front surface, back surface, and opposite side edges. A code (e.g., alpha-numeric, QR code, bar code, etc.) on each lottery ticket that identifies the pack and an order or position of the lottery ticket in the stack. For example, this information may be contained in a unique serial number bar code printed on the front or back surface of the lottery ticket.

A unique marking pattern is provided along a first side edge of each lottery ticket, wherein the marking pattern comprises at least one mark, such as a stripe or other area having a defined discolored length. The marking pattern may include a plurality of such marks. The marking patterns are "unique" in that no two lottery tickets in the pack have the same marking pattern along the first side edge, and each respective marking pattern can be used to identify the lottery ticket on which it is printed, as explained herein.

Each pack has a side face defined by the first side edges of the lottery tickets in the stack, wherein the marking pattern on the lottery tickets in the stack align so as to form an identification image on the side face that is unique to the pack. The identification image can be any suitable image or indicia that is visually perceived or readable by a person (e.g., retail establishment personnel) and used to differentiate one pack from another pack of lottery tickets for accountability, inventory, security, and any other reason. In a particular embodiment, the identification image may be an alpha-numeric sequence or chain of characters.

To verify authenticity of a lottery ticket at a subsequent time after the lottery tickets are removed from the pack, for example after sale or other distribution of the tickets from a retail establishment, the ticket code is used to determine the particular pack that contained the lottery ticket and the order or location of the lottery ticket within the pack. Based on this information, a replica of the marking pattern that was used for the ticket can be retrieved from a database or recreated based on an original print algorithm and presented to the vendor or other person verifying the lottery ticket for redemption of a prize of other purpose. At this point, a comparison can be made between the marking pattern on the replica and the lottery ticket presented for verification The one or more marks making up the marking pattern on the side edge of the lottery tickets may include various differentiating characteristics, including any combination of number of marks, length of the marks, spacing between marks, location of the marks along the edge, and so forth.

In an embodiment wherein the identification image on the side face of the pack is a sequence of alpha-numeric characters, at least one of the characters may be formed by the marking pattern on all of the lottery tickets in the pack. For example, one of the characters may be larger than the rest of the characters and extend between the uppermost and lowermost lottery tickets in the pack. In an alternate embodiment, each one of the alpha-numeric characters may be formed by the marking pattern on all of the lottery tickets in the pack.

In other embodiments wherein the alpha-numeric characters are formed by the marking pattern on less than all of the lottery tickets in the pack, the identification image may include an additional character formed by the marking pattern on at least the lottery tickets not used to form the alpha-numeric characters. For example, the lottery tickets not used to define the alpha-numeric characters may include a marking pattern that combines to define a slanted stripe or other similar mark that ensures that every lottery ticket in the pack includes a unique marking pattern. Alternatively, this additional character may be by the marking pattern on all of the lottery tickets in the pack, such as a slanted line or stripe than runs through the alpha-numeric characters or is disposed alongside the alpha numeric characters.

The present invention also encompasses various method embodiments for forming a pack of lottery tickets and verifying authenticity of individual lottery tickets within the pack. The method may include printing a continuous formation of lottery tickets, such as conventional scratch-off lottery tickets, wherein the lottery tickets are interconnected end-to-end. This step may include printing multiple formations on a substrate where such formations are also interconnected along the side edges, as is well-known in the art. Each lottery ticket includes opposite side edges, a top surface, and a bottom surface.

The method may include printing a unique code on each lottery ticket, such as a bar code, QR code, alpha-numeric code, or the like, wherein the unique code on each lottery ticket identifies the pack and order or location of the lottery ticket within the pack.

The method may include printing a unique marking pattern along the first side edge of each lottery ticket during the printing process, wherein the marking pattern comprises at least one mark. The formation of lottery tickets is eventually folded into a fan-folded stack wherein the first side edges define a side face of the stack or pack.

The marking patterns are determined with a computer system and associated printing algorithm such that the marking pattern for each lottery ticket in the pack is unique and a totality of the marking patterns align to form an identification image on the side face that is unique to the pack and readable by a person or scanner for identifying or accounting for one pack from another pack.

At a subsequent time after the lottery tickets have been separated and distributed from the pack, it will become necessary to verify authenticity of at least some of the lottery tickets within the pack, such as winning tickets that are presented for redemption of a prize. For this purpose, the method may include scanning and using the unique code on the presented lottery ticket to identify the pack from which the presented lottery ticket was sold and the order or location of the presented lottery ticket in the pack. Based on the order or location of the presented lottery ticket in the identified pack, the marking pattern that should be present on the presented lottery ticket can be determined, for example by recreating a replica (e.g., image) of the marking pattern by entering the pack identification and ticket location information into the printing algorithm or retrieving a stored image of the marking pattern from a database. The replicated or retrieved image can be transmitted to the verification location where the marking pattern on the presented lottery ticket is compared to the replicated or retrieved image (e.g., visually or via scanning or photographic equipment) to verify the lottery ticket.

In a particular embodiment, the marking pattern is printed onto a front or back face of each of the lottery tickets adjacent the first side edge during the continuous printing of the lottery ticket formation in a manner so as to penetrate into the paper stock and be visible along the first side edge.

Various embodiments of the method include any one or combination of the lottery ticket characteristics discussed above.

DETAILED DESCRIPTION

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Figure 1:
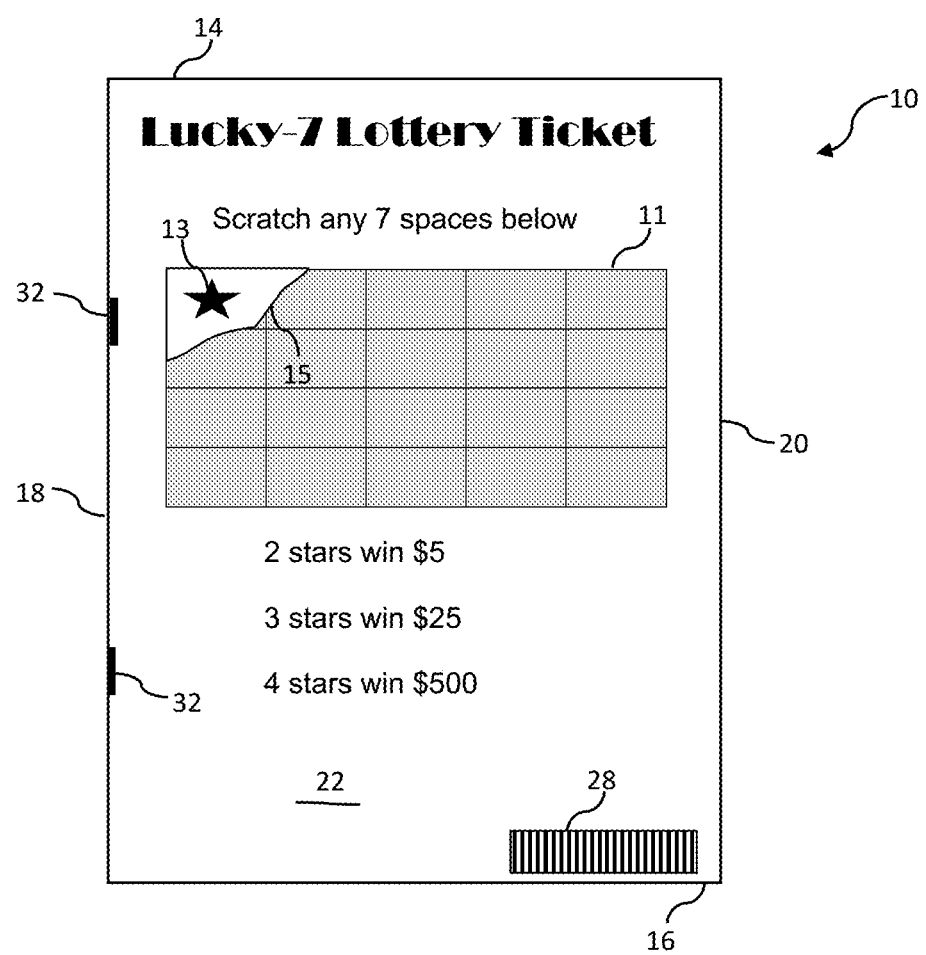
FIG. 1 is a front aspect view of an exemplary lottery ticket, such as a scratch-off lottery ticket, with a marking pattern printed alongside a first side edge.

FIG. 1 depicts an example of a lottery ticket 12 as a scratch-off lottery ticket having a game play area 11 wherein a plurality of game symbols 13 are covered by a scratch-off coating 15. Typically, the number of matches of game symbols 13 or matches between the game symbols 13 and other play symbols on the lottery ticket 12 determines whether or not the lottery ticket is a winning ticket and the corresponding prize value. It should be understood that conventional types of scratch-off lottery ticket games are well-known in the industry and the present invention is not limited to any particular type, style, or other characterizing features of the game embodied by the lottery ticket 12.

Typically, the lottery tickets 12 are provided to vendors in the form of a pack 10 (FIG. 2), wherein each pack includes a plurality of the lottery tickets 12 inter-connected (end-toend) and fan-folded into a stack 26, as is known in the industry. As explained above, each pack 10 includes a unique identification means that enables the vendor to account for received packs 10 (or for any other reason, such as security, inventory, ordering, and so forth).

Referring again to FIG. 1, each lottery ticket 12 includes a front face 22, back face 24 (FIG. 2), first side edge 18, second side edge 20, and opposite ends 14, 16. A code 28 (e.g., alpha-numeric, QR code, bar code, etc.) is printed on each lottery ticket 12 (e.g., on the front face 22, back face 24, or both of the front and back faces) that identifies the pack and an order or position of the lottery ticket 12 in the stack 26. For example, this information may be contained in a unique serial number bar code 28 printed on the front 22 or back surface 24 of the lottery ticket, wherein the serial number also conveys the position of the lottery ticket within the stack 26.

Figure 2:
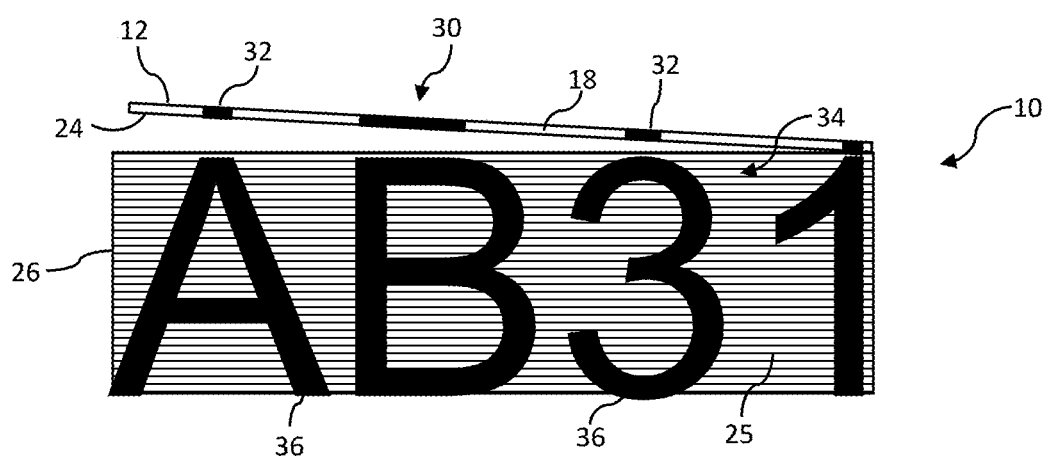
FIG. 2 is a side aspect view of a pack of fan-folded lottery tickets depicting an identification image formed by the marking pattern on the first side edges of the individual lottery tickets.

Referring to FIGS. 1 and 2, a unique marking pattern 30 is provided along either one of the side edges 18, 20. For purposes of example only, in the figures the unique marking pattern 30 is located along the first side edge 18. The marking pattern 30 includes at least one mark 32. In the illustrated examples, the marks 32 are lines or stripes having a discoloration so as to be visible from a side aspect of the lottery ticket 12 looking at the first side edge 18. The marking pattern 30 may include a plurality of such marks 32, and the marking pattern 30 is unique in that no two lottery tickets 12 in the pack 10 have the same marking pattern 30 along the first side edge 18. Thus, each respective marking pattern 30 is used to identify the lottery ticket 12 on which the pattern 30 is printed, as explained herein. The marking pattern 30 may also be visible from a front face 22 or back face 24 view of the lottery ticket 12 adjacent the side edge 18, 20, as depicted for example in FIG. 1. This characteristic may result from how the marking pattern 30 in printed onto a continuous formation of the interconnected lottery tickets 12 and may serve to aid in identifying authentic tickets, as discussed in greater detail below.

Figure 6:
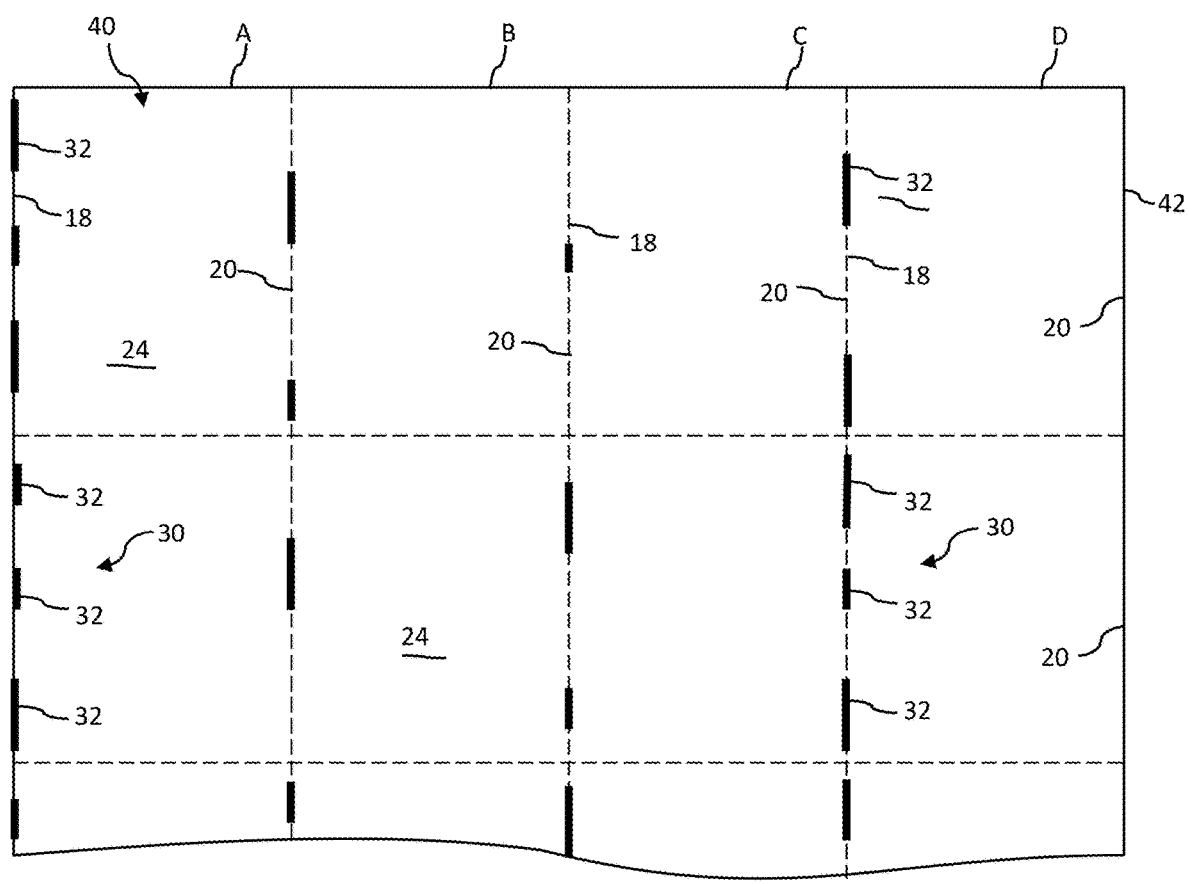
FIG. 6 is a top view of a substrate printed with multiple ticket formations in accordance with aspects of the invention.

The individual marks 32 are "along the side edge" in that they are visible from the side aspect of the lottery ticket 12, as depicted in FIG. 2. The marks 32 may also be visible from the front face 22 aspect, as depicted in FIG. 1. For example, referring to FIG. 6, during the continuous printing process of a strip or formation 40 of the interconnected lottery tickets 12, the marks 32 may be printed directly onto the front 22 or back 24 face of the ticket substrate along the perforation line that separates the various ticket formations 40. FIG. 6 depicts, for example, a ticket substrate 42 defining four distinct ticket formations A-D, wherein adjacent formations share an edge perforation line along which the formations 40 are eventually separated before being divided into a defined number of lottery tickets 12 and fan-folded into stacks 26 for individual packs 10. To provide the marking patterns 30 along the first side edges 18 of ticket formations B, C, and D, the marks 32 are printed as stripes or lines across the shared perforation lines. The printing ink penetrates the substrate 42 along the perforation line such that the marks 32 are then visible along the first side edge 18 when the formations A-D are separated.

It is understood that the marks 32 will also be present along the side edges 20 of the adjacent ticket formations 40, for example along the side edges 20 of the lottery tickets 12 in formations C, B, and A. However, the images created on the side surface of the stacks 26 defined by the second side edges 20 will be a mirror image of that on the first side edges 18 of the adjacent formation and will be easily visually recognizable as such by the vendor personnel. For example, the image on the side of a ticket pack 10 from formation C viewed from the second side edges 20 will be the mirror image of that on the side of the ticket pack 10 from the adjacent formation D viewed from the first side edges 18. The mirror image will be readily recognized by a vendor or clerk as meaningless and not as the unique identification mark intended for the ticket pack 10.

Referring to FIGS. 2-5, each pack 10 has a side face 25 defined by the first side edges 18 of the lottery tickets 12 fan-folded into the stack 26. The unique marking pattern 30 on the lottery tickets 12 in the stack 26 align so as to form an identification image 34 on the side face 25 that is unique to the pack 10. It should be appreciated that the identification image 34 can be any suitable image or indicia that is visually perceived or readable by a person (e.g., retail establishment clerk or other personnel) and used to differentiate one pack 10 from another pack 10 of lottery tickets for accountability, inventory, security, and any other reason. In a particular non-limiting embodiment depicted in the figures, the identification image 34 is an alpha-numeric sequence or chain of characters 36.

The one or more marks 32 making up the marking pattern 30 on the side edge 18 of the lottery tickets 12 may include various differentiating characteristics, including any combination of number of marks 32, length of the marks 32, spacing between marks 32, location of the marks 32 along the edge 18, and so forth.

In an embodiment wherein the identification image 34 is a sequence of alpha-numeric characters 36, at least one of the characters 36 may be formed by the marking pattern 30 on all of the lottery tickets in the pack 10. For example, in the embodiment of FIG. 2, each of the characters 36 extends between the uppermost lottery ticket 12 and lowermost lottery ticket 12 in the stack 26 such that every lottery ticket 12 in the stack has a marking pattern 30 on its first side edge 18 that contributes to the identification image 34. The alpha-numeric characters 36 or other indicia, pattern, or graphic used as the identification image 34 are selected such that no two marking patterns 30 on tickets 12 within the stack 26 are the same, as can be readily appreciated from the figures.

Still referring to FIG. 2, in an alternate embodiment, less than all of the alpha-numeric characters 36 may extend between the uppermost and lowermost tickets 12 in the stack 26. For example, only the "B" and "3" characters might satisfy this criteria. However, the requirement that no two tickets 12 within the stack 26 share the same marking pattern 30 is still satisfied.

Figure 3:
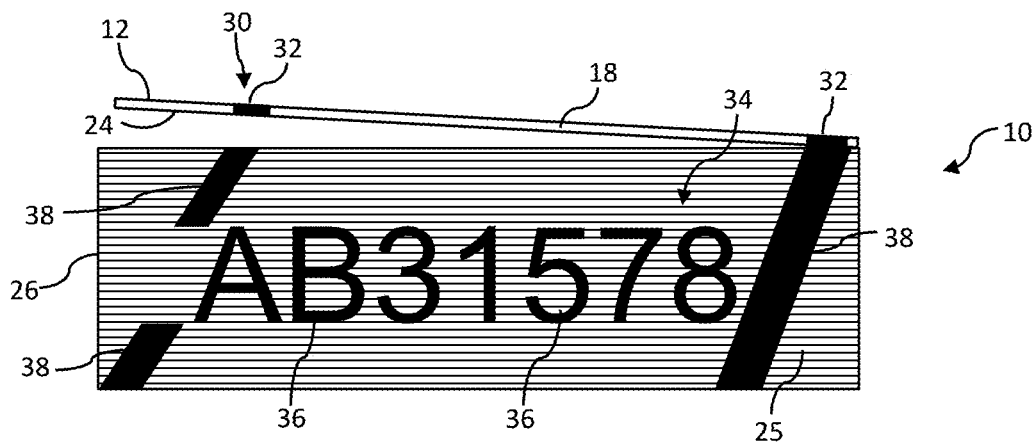
FIG. 3 is a side aspect view of an alternate pack embodiment of fan-folded lottery tickets in accordance with aspects of the invention.

FIG. 3 depicts an embodiment wherein the alpha-numeric characters 36 are formed by the marking pattern 30 on less than all of the lottery tickets 12 in the pack 10. For example, a number of the tickets 12 along the top and bottom of the stack 12 do not contribute a marking pattern 30 to the alpha-numeric characters 36. In this instance, the identification image 34 may include an additional character 38 formed by the marking pattern 30 on at least the lottery tickets 12 not used to form the alpha-numeric characters 36. For example, the additional character 38 may be a slanted stripe or other mark alongside the alpha-numeric characters 36 formed by the marking pattern 30 of at least the lottery tickets 12 not used to define the alpha-numeric characters 36. The left-hand additional mark 38 in the embodiment of FIG. 3 is formed only by the marking pattern 30 of the lottery tickets 12 not used for the alpha-numeric characters 36. In an alternate embodiment as depicted by the right-hand additional mark 38 in the embodiment of FIG. 3, the mark 38 is alongside the alpha-numeric string of characters and is formed by the marking pattern 30 from all of the tickets 12 in the pack 10.

Figure 4:
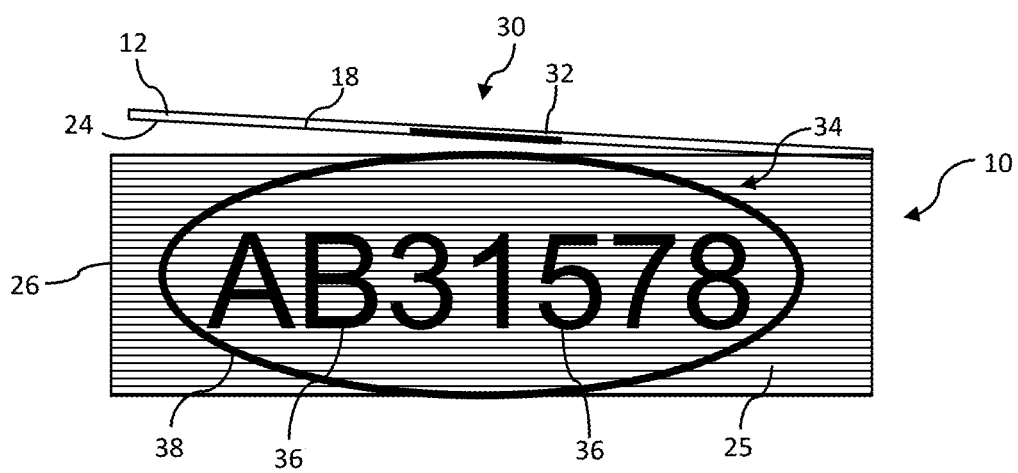
FIG. 4 is a side aspect view of another pack embodiment of fan-folded lottery tickets in accordance with aspects of the invention.

In the embodiment of FIG. 4, the additional character 38 surrounds the string of alpha-numeric characters 36 (e.g., as an oval, circle, rectangle, etc.). Thus, the marking pattern 30 is formed on all of the lottery tickets 12 in the pack 10.

Figure 5:
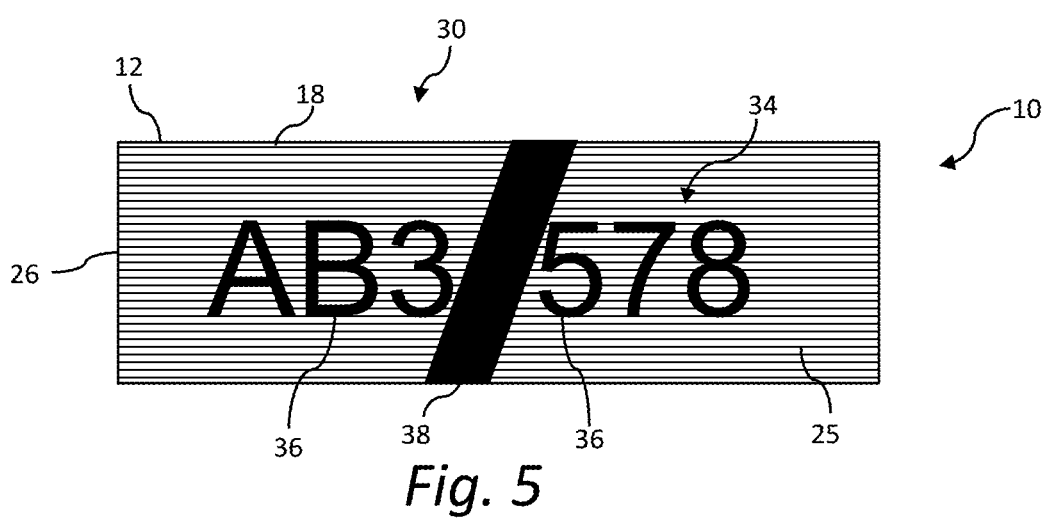
FIG. 5 is a side aspect view of still a different embodiment of fan-folded lottery tickets in accordance with aspects of the invention.

In the embodiment of FIG. 5, the additional character 38 is a slanted stripe or line that runs through and essentially divides the string of alpha-numeric characters 36, and is formed by the marking pattern 30 on all of the lottery tickets 12 in the pack 10.

The present invention also encompasses various method embodiments for forming a pack of lottery tickets and verifying authenticity of individual lottery tickets within the pack, as supported by the figures and above-description and discussed in greater detail.

Referring to the figures in general, an embodiment of the method may include printing a continuous formation 40 of lottery tickets 12, such as conventional scratch-off lottery tickets, wherein the lottery tickets 12 are interconnected end-to-end (FIG. 4). This step may include printing multiple formations 40, such as formations A-C discussed above, on a substrate 42 where such formations 40 are also interconnected along the side edges, as is well-known in the art. Each lottery ticket 12 includes opposite side edges 18, 20, a top surface 22, and a bottom surface 24.

The method may include printing a unique code 28 on each lottery ticket 12, such as a bar code, QR code, alpha-numeric code, or the like, wherein the unique code 28 identifies the pack 10 in which the ticket is contained and the order or location of the lottery ticket 12 within the pack 10, wherein such position determines the unique marking pattern 30 printed on the ticket 12.

The method may include printing the unique marking pattern 30 along one of the side edges (e.g., the first side edge 18) of each lottery ticket 12 during the printing process, wherein the marking pattern 30 comprises at least one mark 32. The formation 40 of lottery tickets 12 is eventually folded into a fan-folded stack 26 wherein the first side edges 18 define a side face 25 of the stack 26 (and the pack 10).

The marking patterns 30 are determined with a computer system and associated printing algorithm that defines the unique marking pattern 30 to be applied to each lottery ticket 12 such that the marking pattern 30 for each lottery ticket 12 in the pack 10 is unique and a totality of the marking patterns 30 align to form the unique identification image 34 on the side face 25 that is unique to the pack and readable by a person or scanner for identifying or accounting for one pack 10 from another pack 10.

At a subsequent time after the lottery tickets 12 have been separated and distributed from the pack 10, it will become necessary to verify authenticity of at least some of the lottery tickets 12 from the pack 10, such as winning tickets 12 that are presented at a later date for redemption of a prize. For this purpose, the method may include scanning and using the unique code 28 on the presented lottery ticket 12 to identify the pack 10 from which the presented lottery ticket 12 was sold and the order or location of the presented lottery ticket 12 in the pack 10. Based on the order or location of the presented lottery ticket 12 in the identified pack 10, the marking pattern 30 that should be present on the presented lottery ticket 12 (if the ticket is authentic) can be determined by various means.

For example, in one embodiment, a replica (e.g., a duplicate image) of the marking pattern 30 can be created by a central lottery server that receives the unique code 28 by entering the pack identification and ticket location information contained in the code 28 into the printing algorithm that was used to create the original marking patterns 30 for the respective pack 10. This replica image may then be transmitted to the verification location in a form that allows the vendor to compare the marks 32 on the side edge 18 of the presented lottery ticket 12 with the replica image. For example, the replica image may be a front or back face view of a blank ticket wherein essentially only the markings 32 are depicted on the face adjacent the corresponding first side edge of the blank ticket having the defining characteristics of the marking pattern 30 (e.g., number of marks, length of marks, spacing between marks, etc.) that should be present on the presented lottery ticket. This blank ticket replica could essentially be the ticket of FIG. 1 without any of the game play indicia, etc. It would be a relatively easy exercise for the vendor to simply lay the presented lottery ticket 12 (with the marks 32 visible on the face of the lottery ticket) on the screen with the first side edge 18 thereof adjacent the side edge of the replica to compare the marks 32 between the replica image and the presented lottery ticket 12.

In another embodiment, the vendor may scan the face of the presented lottery ticket 12 (or just the first side edge 18) with a scanner or photographic equipment that shows the marks 32 and transmit the image to the central lottery server, wherein the comparison between the marking pattern 30 of the presented lottery ticket 12 and the replica image is conducted by the central lottery server with the result transmitted back to the vendor or other verification location.

In still another embodiment, a record file in a database for at least winning lottery tickets 12 in the pack 10 may contain a pre-generated replica image that is retrieved upon receipt of the ticket code 28, wherein the pre-generated replica image can be used as discussed above.

Various embodiments of the method include forming the identification mark 34 with the combined marking patterns 30 in accordance with any of the embodiments of FIGS. 2 through 5 above, or any other characteristic of the lottery tickets 12 discussed above.

What is claimed is:

1. A lottery system comprising a pack of lottery tickets, the pack of lottery tickets comprising: a plurality of interconnected lottery tickets fan-folded into a stack, wherein each lottery ticket comprises a first side edge; a code on each lottery ticket that identifies the pack and an order or position of the lottery ticket in the pack; a marking pattern along the first side edge of the lottery tickets, wherein the marking pattern comprises at least one mark; the pack comprising a side face defined by the first side edges of the lottery tickets in the pack, wherein the marking pattern on the lottery tickets in the stack align so as to form an identification image on the side face that is unique to the pack; and the marking pattern on each lottery ticket being unique to the respective lottery ticket such that no two lottery tickets in the stack have the same marking pattern and wherein the marking pattern is linked to the code on each lottery ticket such that each lottery ticket in the pack is separately authenticatable when separated from the pack by scanning the code to retrieve an image of marks that should be on the ticket based on the pack identity and order or position of the lottery ticket in the pack, and comparing its marking pattern to the retrieved image.

2. The lottery system as in claim 1, wherein a differentiating characteristic of the marking pattern between different lottery tickets in the pack comprises any one or combination of number of marks, length of the marks, spacing between marks, and location of the marks along the edge.

3. The lottery system as in claim 1, wherein the identification image comprises a string of alpha-numeric characters.

4. The lottery system as in claim 3, wherein at least one of the alpha-numeric characters is formed by the marking pattern on all of the lottery tickets in the pack.

5. The lottery system as in claim 4, wherein each of the alpha-numeric characters are formed by the marking pattern on all of the lottery tickets in the pack.

6. The lottery system as in claim 3, wherein the alpha-numeric characters are formed by the marking pattern on less than all of the lottery tickets in the pack, the identification image further comprising an additional character formed by the marking pattern on at least the lottery tickets not used to form the alpha-numeric characters.

7. The lottery system as in claim 6, wherein the additional character is formed by the marking pattern on all of the lottery tickets in the pack.

8. The lottery system as in claim 7, wherein the additional character runs through the alpha-numeric characters or is disposed alongside the alpha numeric characters.

9. A method for forming a pack of lottery tickets and verifying authenticity of individual lottery tickets within the pack, comprising: printing a continuous formation of lottery tickets interconnected end-to-end, wherein each lottery ticket has a first side edge: printing a unique code on each lottery ticket; providing a marking pattern along the first side edge of each lottery ticket during the printing, wherein the marking pattern comprises at least one mark; folding the formation of lottery tickets into a fan-folded stack wherein the first side edges define a side face of the pack, the unique code on each lottery ticket identifying the pack and order or location of the lottery ticket within the pack; the marking, pattern for each lottery ticket in the pack being unique such that no two lottery tickets in the pack have the same marking pattern and a totality of the marking patterns in the pack align to form an identification image on the side face that is unique to the pack and usable by a person for visually identifying for one pack from another pack; verifying authenticity of one of the lottery tickets from the pack presented for redemption by: scanning the unique code on the presented lottery ticket to retrieve an image of marks that should be on the ticket, and identify the pack from which the presented lottery ticket was distributed and the order or location of the presented lottery ticket in the pack; based on the pack identification and order or location of the presented lottery ticket in the identified pack, determining the marking pattern that should be present on the presented lottery ticket based on the retrieved image; and verifying that the determined marking pattern is on the presented lottery ticket.

10. The method as in claim 9, wherein the marking pattern is printed onto a front or back face of each of the lottery tickets adjacent the first side edge in a manner so as to penetrate into stock of the lottery tickets and be visible along the first side edge.

11. The method as in claim 9, wherein a print algorithm is used to print the marking patterns, the step of determining the marking pattern that should be present on the presented lottery ticket comprising entering the identified pack information and order or location of the presented lottery ticket in the identified pack into the print algorithm to generate a replica of the marking pattern that should be present on the presented lottery ticket.

12. The method as in claim 11, wherein the replica is transmitted to a location wherein the presented lottery ticket is presented for redemption.

13. The method as in claim 9, wherein the differentiating characteristics of the marking pattern between different lottery tickets in the pack comprises any one or combination of number, length, and location of the one or more marks along the first side edge.

14. The method as in claim 9, wherein the identification image is formed as a string of alpha-numeric characters on the side face of the stack.

15. The method as in claim 14, wherein at least one of the alpha-numeric characters is formed by the marking pattern on all of the lottery tickets in the pack.

16. The method as in claim 14, wherein each of the alpha-numeric characters are formed by the marking pattern on all of the lottery tickets in the pack.

17. The method as in claim 14, wherein the alpha-numeric characters are formed by the marking pattern on less than all of the lottery tickets in the pack, the identification image further comprising an additional character formed by the marking pattern on at least the lottery tickets not used to form the alpha-numeric characters.

18. The method as in claim 17, wherein the additional character is formed by the marking pattern on all of the lottery tickets in the pack.

* * * * *